US012771222B2

(12) United States Patent
Mao et al.

(10) Patent No.: US 12,771,222 B2
(45) Date of Patent: Oct. 20, 2026

(54) STEPPER MOTOR

(71) Applicant: AAC Microtech (Changzhou) Co., Ltd., Changzhou City (CN)

(72) Inventors: Lubin Mao, Changzhou (CN); Wei Song, Changzhou (CN); Suntong Zhou, Changzhou (CN)

(73) Assignee: AAC Microtech (Changzhou) Co., Ltd., Changzhou City (CN)

(*) Notice: Subject to any disclaimer, the term of this patent is extended or adjusted under 35 U.S.C. 154(b) by 141 days.

(21) Appl. No.: 19/001,520

(22) Filed: Dec. 25, 2024

(65) Prior Publication Data

US 2026/0012072 A1 Jan. 8, 2026

Related U.S. Application Data

(63) Continuation of application No. PCT/CN2024/103198, filed on Jul. 2, 2024.

(51) Int. Cl.
*H02K 37/14* (2006.01)

(52) U.S. Cl.
CPC .................................... *H02K 37/14* (2013.01)

(58) Field of Classification Search
CPC ............................... H02K 37/14; H02K 5/225
See application file for complete search history.

(56) References Cited

U.S. PATENT DOCUMENTS

2021/0281156 A1* 9/2021 Wei ........................ H02K 37/04

FOREIGN PATENT DOCUMENTS

CN 220874296 U * 4/2024
JP H0686528 A * 3/1994

* cited by examiner

*Primary Examiner* — Mohamad A Musleh
(74) *Attorney, Agent, or Firm* — Wiersch Law Group

(57) ABSTRACT

Provided is a stepper motor. The stepper motor includes a rotor shaft, a steel magnet sleeved and fixed to an outer peripheral side of the rotor shaft, a winding unit sleeved to the rotor shaft, and two flexible circuit boards fixed to the winding unit. The winding unit includes two windings. Each winding includes a housing sleeved to and rotationally connected to the rotor shaft, two skeletons fixed to an inner peripheral side of the housing and coaxially disposed with the housing, and coils, where a respective coil is fixed to a respective skeleton. In the stepper motor of the present disclosure, the number of windings in the assembly of the whole machine can be reduced, making the process simpler, reducing the deviation of concentricity after assembly, and also making it possible to avoid the risk of damage to the whole machine caused by the abnormality of the single coil.

9 Claims, 3 Drawing Sheets

STEPPER MOTOR

CROSS REFERENCE TO RELATED APPLICATIONS

The present application is a continuation of PCT Patent Application No. PCT/CN2024/103198, filed Jul. 2, 2024, which is incorporated by reference herein in its entirety.

TECHNICAL FIELD

The present disclosure relates to the technical field of motors and, in particular, to a stepper motor.

BACKGROUND

The stepper motor has been widely used in the fields of electric motors, generators and the like due to its advantages of compact structure, high working efficiency, energy saving, etc. In recent years, there is an increasingly urgent demand in the industrial field for equipment that utilizes a stepper motor to directly drive loads for work, and the wide application of these stepper motor direct-drive equipment can bring great energy-saving benefits.

In the existing art, the stepper motor may be classified as a multi-winding structure according to the winding, where the stepper motor of a four-winding structure includes a rotor shaft, a steel magnet fixed to an outer peripheral side of the rotor shaft, and windings sleeved to the rotor shaft and rotationally connected to the rotor shaft. The windings includes four windings, and each winding includes one housing, two claw poles, and one coil. The windings are assembled and then sleeved to the rotor shaft to form a complete stepper motor.

Although the stepper motor of the above four-winding structure can form a complete stepper motor after assembly, the four windings need to be assembled individually, and then sleeved to the rotor shaft. Such process of assembling four windings is not only cumbersome, but also needs to ensure the concentricity of the four windings, which may easily cause the deviation of concentricity, and in serious cases, causes the stepper motor to become an unqualified product.

Therefore, a novel stepper motor is desired to solve the above technical problems.

SUMMARY

The present disclosure provides a stepper motor, to solve the problem of cumbersome assembly and deviation of concentricity easily caused in a stepping motor of a four-winding structure in the existing art.

To achieve the above objective, the present disclosure provides a stepper motor. The stepper motor includes a rotor shaft, a steel magnet, a winding unit, and two flexible circuit boards. The steel magnet is sleeved and fixed to an outer peripheral side of the rotor shaft. The winding unit is sleeved to the rotor shaft and rotationally connected to the rotor shaft, where the winding unit includes two windings spaced apart from the steel magnet. The two flexible circuit boards are fixed to the winding unit and electrically connected to the winding unit. Each of the two windings includes a housing, two skeletons, and coils. The housing is sleeved to the rotor shaft and rotationally connected to the rotor shaft. The two skeletons are fixed to an inner peripheral side of the housing and coaxially disposed with the housing. Each respective coil of the coils is fixed to a respective skeleton of the two skeletons, where the respective skeleton includes two claw poles disposed opposite to each other, and the respective coil is disposed around outer peripheral sides of the two claw poles. Each respective flexible circuit board of the two flexible circuit boards is fixed to an outer peripheral side of the housing of a respective winding of the two windings and electrically connected to all coils in the respective winding, and the two flexible circuit boards have adjacent ends welded together to form electrical connection.

As an improvement, each of the two claw poles includes an annular fixed portion fixed in the housing, and a plurality of spaced extension portions formed by extending from an inner periphery of the fixed portion in an axial direction of the fixed portion, where the plurality of extension portions in one of the two claw poles extend toward the other of the two claw poles.

As an improvement, each of the plurality of extension portions in the one of the two claw poles extends between respective two extension portions of the plurality of extension portions in the other of the two claw poles.

As an improvement, the respective skeleton further includes a support member sleeved and fixed to extension portions of the two claw poles, the respective coil being wound around an outer peripheral side of the support member.

As an improvement, the housing includes a body portion, and a cover body. The body portion is hollow and open at both ends of the body portion. The rotor shaft is fixed to the cover body by means of a bearing and rotationally connected to the cover body, and in one of the two windings, the cover body covers one end of the both ends of the body portion facing away the other of the two windings.

As an improvement, the body portion is provided with an inwardly protruding step on an inner peripheral side of the body portion. One of the two claw poles in one of the two skeletons is fixed to one side of the step, and one of the two claw poles in the other of the two skeletons is fixed to another side of the step.

As an improvement, the body portion is provided with a plurality of avoidance holes therethrough, and one end of each of the coils is connected to the respective flexible circuit board through a respective one of the plurality of avoidance holes.

As an improvement, a plurality of steel magnets are provided, and the plurality of steel magnets are disposed around and fixed to the outer peripheral side of the rotor shaft, and spaced apart from each other.

As an improvement, the stepper motor further includes two spaced gaskets sleeved to the rotor shaft and abutting two ends of the steel magnet respectively.

Compared with the existing art, in the stepper motor of the present disclosure, each large winding is designed to include one housing, four claw poles and two coils. That is, two small windings form one large winding, and each large winding is designed with a flexible circuit board electrically connected to all coils in the large winding. Two flexible circuit boards are welded together to realize the electrical connection between all coils in two large windings, thereby reducing the number of windings in the assembly of the whole machine, making the process simpler, reducing the deviation of concentricity after assembly, and also making it possible to individually replace a single coil in case of abnormality so as to avoid the risk of damage to the whole machine caused by the abnormality of the single coil.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other accompanying drawings from these accompanying drawings without creative efforts.

IN THE FIGURES

| | | | | | |
|---|---|---|---|---|---|
| 100 | stepper motor | 1 | rotor shaft | 2 | steel magnet |
| 3 | winding | 31 | housing | 311 | body portion |
| 3111 | step | 3112 | avoidance hole | | |
| 312 | cover body | 32 | skeleton | 321 | claw pole |
| 3211 | fixed portion | 3212 | extension portion | | |
| 33 | coil | 34 | support member | | |
| 35 | bearing | 4 | flexible circuit board | 5 | gasket |

DETAILED DESCRIPTION OF THE EMBODIMENTS

The technical solutions in the embodiments of the present disclosure are described in detail clearly and completely hereinafter with reference to the accompanying drawings. Apparently, the described embodiments are only a part, but not all, of the embodiments of the present disclosure. Based on the embodiments of the present disclosure, all other embodiments obtained by a person of ordinary skill in the art without creative efforts fall within the scope of protection of the present disclosure.

Figure 1:
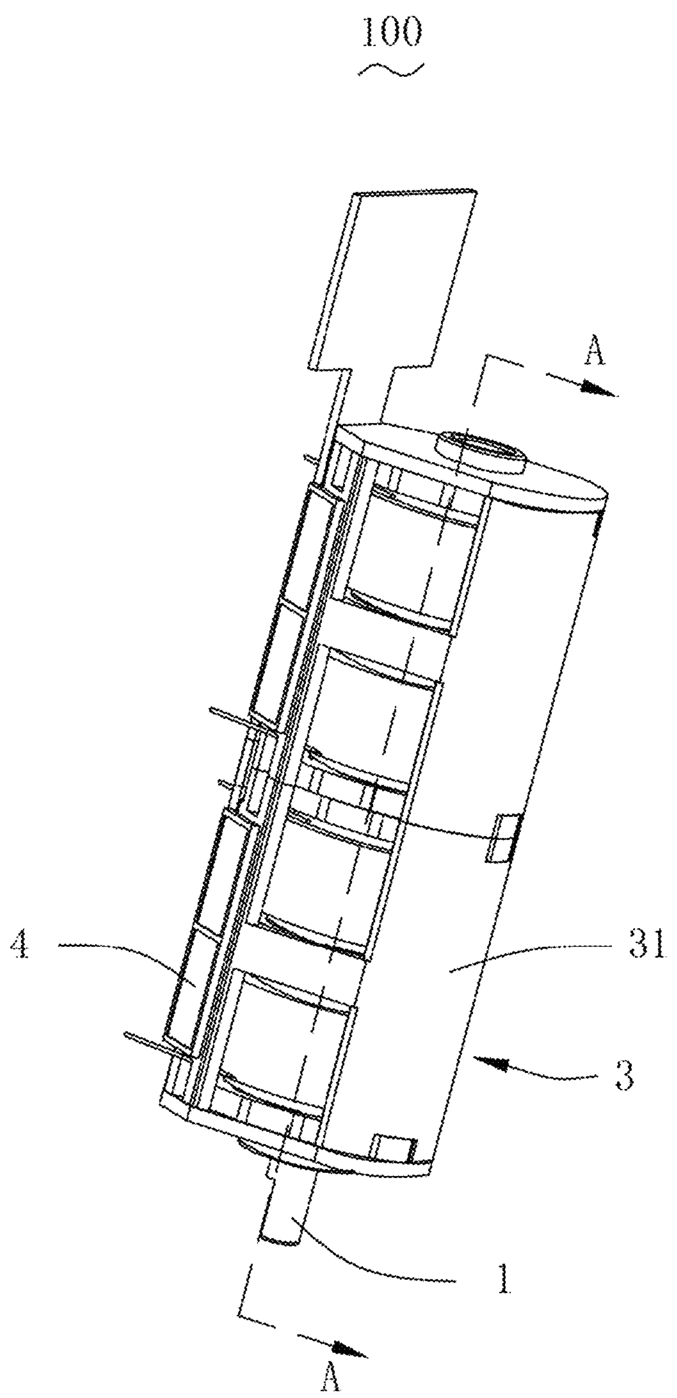
FIG. 1 is a schematic perspective view of a stepper motor according to an embodiment of the present disclosure.
Figure 2:
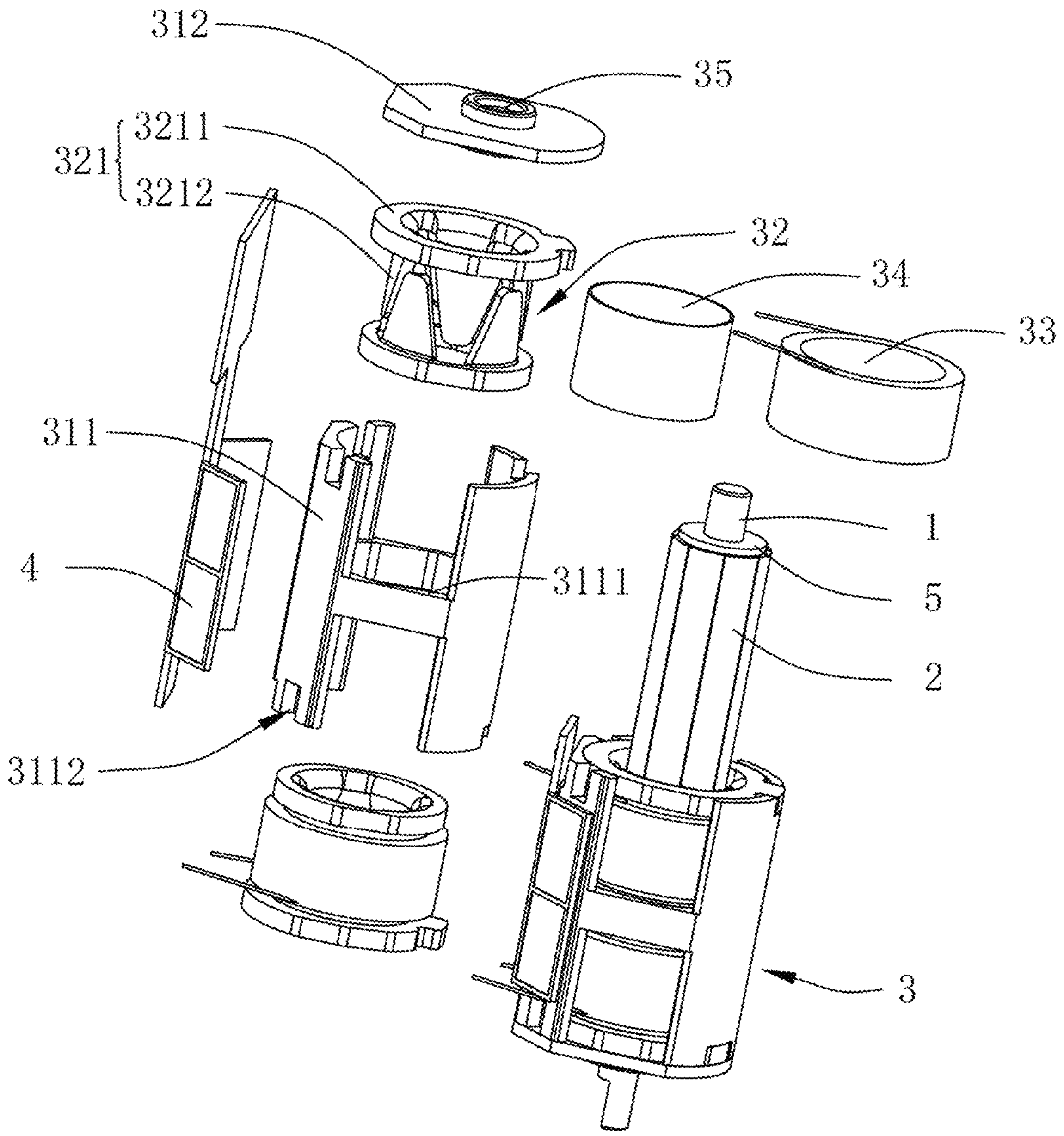
FIG. 2 is an exposed view of a part of the structure of a stepper motor according to an embodiment of the present disclosure.
Figure 3:
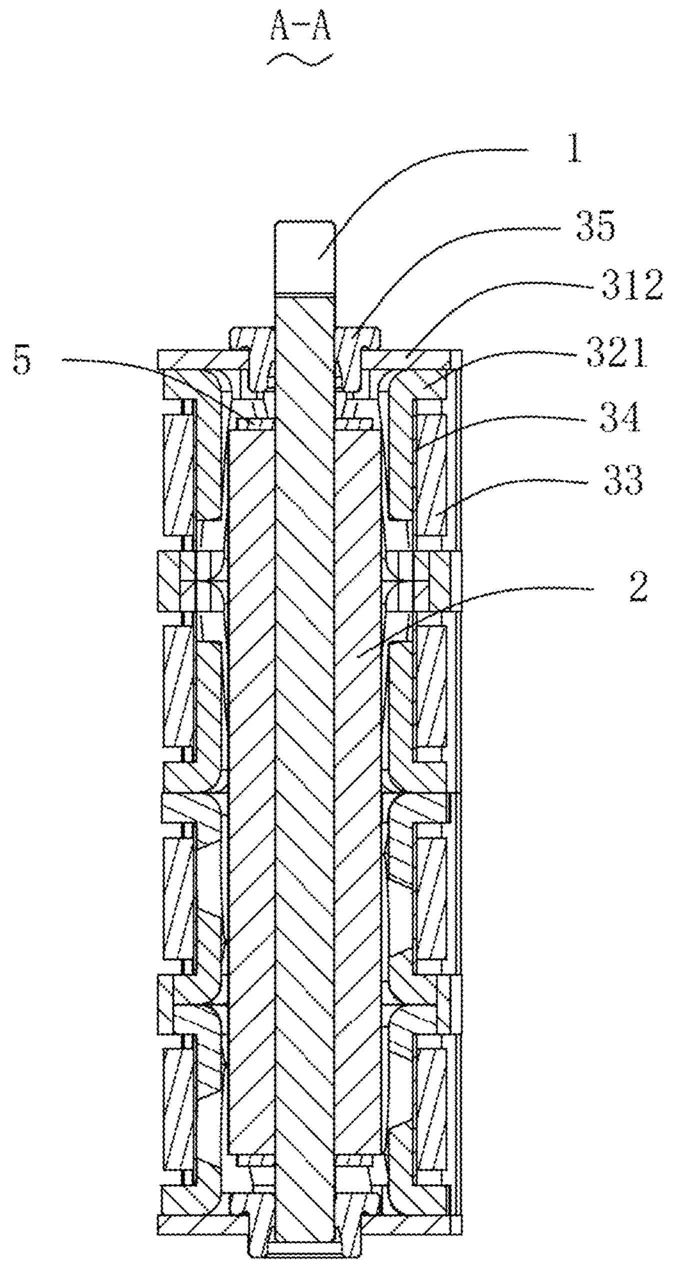
FIG. 3 is a sectional view taken along line A-A of FIG. 1.

An embodiment of the present disclosure provides a stepper motor 100. As shown in FIGS. 1 to 3, the stepper motor 100 includes a rotor shaft 1, a steel magnet 2, a winding unit, and flexible circuit boards 4. The steel magnet 2 is sleeved and fixed to an outer peripheral side of the rotor shaft 1, the winding unit is sleeved to the rotor shaft 1 and rotationally connected to the rotor shaft 1, and the flexible circuit boards 4 are fixed to the winding unit and electrically connected to the winding unit. The winding unit includes two windings 3 spaced apart from the steel magnet 2.

In some embodiments, a plurality of steel magnets 2 are provided, and the plurality of steel magnets 2 are disposed around and fixed to the outer peripheral side of the rotor shaft 1, and spaced apart from each other. In some embodiment, the number of steel magnets 2 may, or may not, coincide with the number of windings 3.

Each of the two windings 3 includes a housing 31, two skeletons 32, and coils 33. The housing 31 is sleeved to the rotor shaft 1 and rotationally connected to the rotor shaft 1. The two skeletons 32 are fixed to an inner peripheral side of the housing 31 and coaxially disposed with the housing 31. A respective coil 33 of the coils 33 is fixed to a respective skeleton 32 of the two skeletons 32. Each skeleton 32 includes two claw poles 321 disposed opposite to each other, and the respective coil 13 is disposed around outer peripheral sides of the two claw poles 321 in the same skeleton 32.

The housing 31 includes a body portion 311 which is hollow and open at both ends of the body portion 311, and a cover body 312. The rotor shaft 1 is fixed to the cover body 312 by means of a bearing 35 and is rotationally connected to the cover body 312. In one of the two windings 3, the cover body 312 covers one end of both ends of the body portion 311 facing away the other of the two windings 3.

The body portion 311 is provided with an inwardly protruding step 3111 on an inner peripheral side of the body portion 311. One of two claw poles 321 in one of the two skeletons 32 is fixed to one side of the step 3111, and one of two claw poles 321 in the other of the two skeletons 32 is fixed to another side of the step 3111. This design facilitates the fixation of the claw poles 321 located in the central region of the housing 31.

The body portion 311 is further provided with a plurality of avoidance holes 3112 therethrough. One end of the coil 33 passes through the avoidance hole 3112 to be connected to the flexible circuit board 4. This design facilitates the passage of the coil 33 through the housing 31 for connection to the flexible circuit board 4.

Each claw pole 321 includes an annular fixed portion 3211 fixed in the housing 31, and a plurality of spaced extension portions 3212 formed by extending from an inner periphery of the fixed portion 3211 in an axial direction of the fixed portion 3211. In the same skeleton 32, the extension portions 3212 of one of the two claw poles 321 extend toward the other one of the two claw poles 321.

In the same skeleton 32, each of the extension portions 3212 of one of the two claw poles 321 extends between respective two extension portions of the extension portions in the other of the two claw poles 321.

Each skeleton 32 further includes a support member 34 fixed to the extension portions 3212 of two claw poles 321. The coil 33 is wound on the outer peripheral side of the support member 34. This design creates a flat annular plane on the outer peripheral side of two claw poles 321 of the skeleton 32 to facilitate fixation of the coil 33.

Two flexible circuit boards 4 are provided. The two flexible circuit boards 4 are fixed to outer peripheral sides of the housings 31 of the two windings 3 respectively. Each flexible circuit board 4 is electrically connected to all the coils in a respective winding 3, and the two flexible circuit boards have adjacent ends welded together to form electrical connection. This design not only realizes the electrical connection between all the coils 33, but also allows individual replacement of a single coil 33 in case of abnormality, so as to avoid the risk of damage to the whole machine caused by the abnormality of the single coil 33.

The flexible circuit board 4 is specifically fixed to the outer peripheral side of the body portion 311 of the housing 31.

In this embodiment, the stepper motor 100 further includes two spaced gaskets 5, which are sleeved to the rotor shaft 1 and abut two ends of the steel magnet 2 respectively. This design can reinforce the fixing strength between the steel magnet 2 and the rotor shaft 1.

In the stepper motor 100 in this embodiment, each winding 3 is designed to include one housing 31, four claw poles 321 and two coils 33. That is, two small windings form one winding 3, and each winding 3 is designed with a flexible circuit board 4 electrically connected to all coils 33 in the winding 3. Two flexible circuit boards 4 are welded together to realize the electrical connection between all the coils 33 in the two windings 3, thereby reducing the number of windings 3 in the assembly of the whole machine, making the process simpler, reducing the deviation of concentricity after assembly, and also making it possible to individually replace a single coil 33 in case of abnormality so as to avoid the risk of damage to the whole machine caused by the abnormality of the single coil 33.

The above are only embodiments of the present disclosure, and it should be noted that for a person of ordinary skill in the art, improvements may be made without departing from the concept of the present disclosure, all of which fall within the scope of protection of the present disclosure.

What is claimed is:

1. A stepper motor, comprising:

a rotor shaft;

a steel magnet, sleeved and fixed to an outer peripheral side of the rotor shaft;

a winding unit, sleeved to the rotor shaft and rotationally connected to the rotor shaft, wherein the winding unit includes two windings spaced apart from the steel magnet; and two flexible circuit boards, fixed to the winding unit and electrically connected to the winding unit;

wherein each of the two windings includes:

a housing, sleeved to the rotor shaft and rotationally connected to the rotor shaft;

two skeletons, fixed to an inner peripheral side of the housing and coaxially disposed with the housing; and coils, wherein a respective coil of the coils is fixed to a respective skeleton of the two skeletons, wherein the respective skeleton includes two claw poles disposed opposite to each other, and the respective coil is disposed around outer peripheral sides of the two claw poles;

wherein each respective flexible circuit board of the two flexible circuit boards is fixed to an outer peripheral side of the housing of a respective winding of the two windings and electrically connected to all coils in the respective winding, and the two flexible circuit boards have adjacent ends welded together to form electrical connection.

2. The stepper motor of claim 1, wherein each of the two claw poles includes an annular fixed portion fixed in the housing, and a plurality of spaced extension portions formed by extending from an inner periphery of the fixed portion in an axial direction of the fixed portion, wherein the plurality of extension portions in one of the two claw poles extend toward the other of the two claw poles.

3. The stepper motor of claim 2, wherein each of the plurality of extension portions in the one of the two claw poles extends between respective two extension portions of the plurality of extension portions in the other of the two claw poles.

4. The stepper motor of claim 2, wherein the respective skeleton further includes a support member sleeved and fixed to extension portions of the two claw poles, the respective coil being wound around an outer peripheral side of the support member.

5. The stepper motor of claim 1, wherein the housing includes:

a body portion, which is hollow and open at both ends of the body portion; and a cover body, wherein the rotor shaft is fixed to the cover body by means of a bearing and rotationally connected to the cover body, and wherein in one of the two windings, the cover body covers one end of the both ends of the body portion facing away the other of the two windings.

6. The stepper motor of claim 5, wherein the body portion is provided with an inwardly protruding step on an inner peripheral side of the body portion, and wherein one of the two claw poles in one of the two skeletons is fixed to one side of the step, and one of the two claw poles in the other of the two skeletons is fixed to another side of the step.

7. The stepper motor of claim 5, wherein the body portion is provided with a plurality of avoidance holes therethrough, and one end of each of the coils is connected to the respective flexible circuit board through a respective one of the plurality of avoidance holes.

8. The stepper motor of claim 1, wherein a plurality of steel magnets are provided, and the plurality of steel magnets are disposed around and fixed to the outer peripheral side of the rotor shaft, and spaced apart from each other.

9. The stepper motor of claim 1, wherein the stepper motor further comprises: two spaced gaskets, sleeved to the rotor shaft and abutting two ends of the steel magnet respectively.

* * * * *